Patented Sept. 2, 1924.

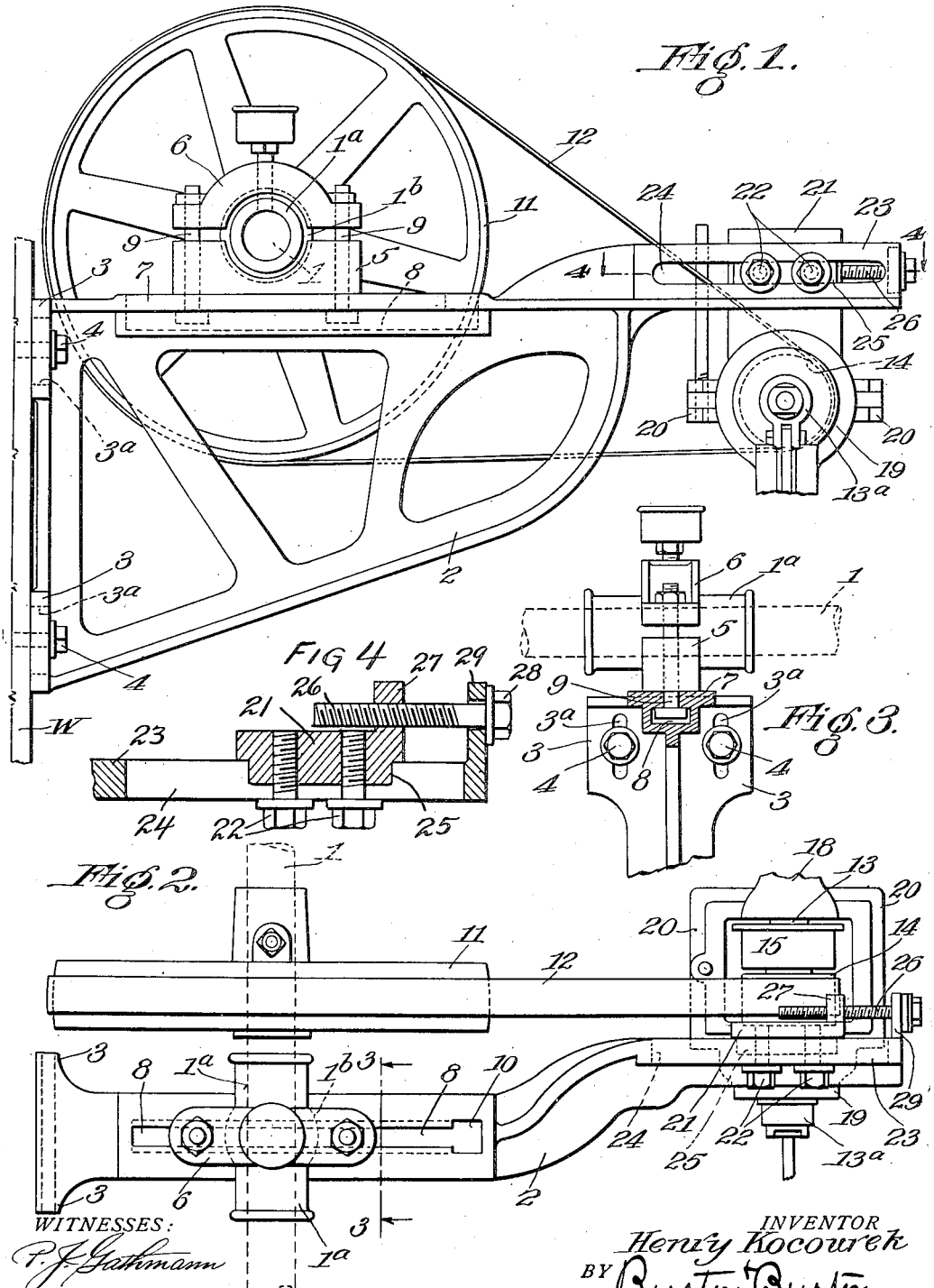

1,507,238

UNITED STATES PATENT OFFICE.

HENRY KOCOUREK, OF CHICAGO, ILLINOIS, ASSIGNOR TO CHICAGO FLEXIBLE SHAFT COMPANY, OF CHICAGO, ILLINOIS, A CORPORATION OF ILLINOIS.

BELT-TIGHTENING DEVICE.

Original application filed May 5, 1919, Serial No. 294,828. Divided and this application filed February 12, 1920, Serial No. 358,236. Renewed April 30, 1923.

*To all whom it may concern:*

Be it known that I, HENRY KOCOUREK, a citizen of the United States, and a resident of the city of Chicago, in the county of Cook and the State of Illinois, have invented certain new and useful Improvements in Belt-Tightening Devices, of which the following is a specification, reference being had to the accompanying drawings, forming a part thereof.

This application is a division of my application No. 294,828, filed May 5th, 1919. The invention of this application relates to means for mounting the bearings for belt-connected driving and driven pulleys for tightening and slackening the belt. It consists in the elements and features of construction shown and described, as indicated in the claims.

In the drawings:—

Figure 1 is a side elevation of a belt transmission device embodying this invention.

Figure 2 is a top plan view of the same.

Figure 3 is a section at the line, 3—3, on Figure 2.

Figure 4 is a section at the line, 4—4, on Figure 1.

The construction shown in the drawings may be understood as associated with a power shaft or so-called "line shaft," indicated at 1. The journal bearings for this shaft are mounted upon a bracket, 2, which is formed with lugs or flanges, 3, having slots, 3ª, through which securing screws, 4, extend into any suitable frame member, such as the vertical post, W, shown in the drawings, or a horizontal member if more convenient. A bearing sleeve, 1ª, for the line shaft, 1, is formed with a spherical portion, 1ᵇ, which is in a block, 5, and retained by a cap, 6, said block and cap being slidably adjustable upon the face, 7, of the bracket, 2, and being retained in adjusted position for proper alignment of the shaft, 1, by means of clamping bolts, 9, extending through slots, 8, in the part, 7, the heads of such bolts having been entered into said slots through an enlargement, 10, at one end thereof. A driving wheel, 11, secured to the shaft, 1, transmits power through a belt, 12, to a driven shaft on which in the structure shown are a fast pulley, 14, and a loose pulley, 15, with which and the belt, 12, are associated means for shifting to engage the belt within the fast or loose pulley; but these belt-shifting devices are the subject matter of my said application No. 294,828, and are not to be described or claimed herein. Sleeves, 13, 13ª, which are the bearings for the shaft or shafts of the pulleys, 14 and 15, are carried in supports, 18 and 19, connected in a single frame casting by arms, 20, and the adjacent part, 19. A flat vertical arm, 21, extends for clamping by means of screws, 22, to the extending arm, 23, of the bracket, 2, having a slot, 24, in which the screws, 22, are slidably adjustable toward and from the line shaft, 1, for obtaining proper tension of the belt, 12. The member, 21, is formed with a rib portion, 25, engaging the slot, 24, to relieve the screws, 22, of any twisting strain on the member, and an adjusting screw, 26, engaging a lug, 27, on said member, 21, bearing upon a corresponding lug, 29, extending from the arm, 23, serves for drawing the member, 21, away from the shaft, 1, against the tension of the belt in making the final adjustment. (See Figure 2.)

The need for or advantage of providing for adjustment of the bearings of both the driving and the driven pulleys may be understood upon considering that the bracket, 2, being mounted upon an available support as the post, W, the bearing of the shaft, 1, must be free to accommodate itself to the line shaft for properly aligning the latter, and that the shaft being in a position in the bearing, and the bearing having come to its proper position on the bracket and the bracket having come to proper position on the post to align the shaft, said bearing and bracket will be secured in those positions by the clamping bolts as described. The necessity for aligning the line shaft creates the necessity for the adjustability of the bearings of that shaft on the bracket. It is then necessary to adjust the bearings of the driven shaft to properly take up the slack of the belt or accommodate the position of the driven shaft to the limited length of the belt; and for this purpose the adjustment of the bearings of the driven shaft on the bracket as described is necessary. In actually taking up the slack of the belt after the bracket has been adjusted on the post, and the bearings of the line shaft adjusted on the bracket to properly align the shaft, obviously only the bearings of the driven shaft will be adjusted on the bracket.

I claim:—

1. In combination with a line shaft, a driving pulley thereon and a fixed support adjacent the shaft, a bearing for said shaft and a bracket to carry said bearing adjacent the driving pulley adapted to be mounted on said fixed support, and having a surface transverse to the mounting surface of such support, with means securing said bearing on said surface of the bracket with capacity for adjustment of the bearing toward and from the support to suit the exact position of the line shaft together with a driven pulley aligned with the driving pulley and bearing means comprising the sole support of such driven pulley carried by said bracket with capacity for adjustment of the pulley axis toward and from the line shaft bearing on said bracket.

2. In the combination defined in claim 1, means for positively adjusting the bearing of the driven pulley toward and from the line shaft bearing and means for securing it to the bracket at adjusted position.

3. In the combination defined in claim 1, the said bearing for the shaft comprising a sleeve with a spherically rounded enlargement encircling it, a block in which said spherical portion is seated, and a cap over it, the block mounted on a portion of the bracket extending transversely of the shaft axis and formed with an elongated slot to permit the aforementioned adjustment of said shaft bearing, together with clamping bolts or screws extending through the said slot and through said block engaging the bracket and the cap for holding said parts in adjusted relation.

4. In the combination defined in claim 1, the said bracket having an arm extending away from said shaft and formed with a slot extending in like direction, the bearing for the driven pulley being disposed below said arm but supported in a frame or carrier having an upwardly extending arm lapped against the arm of the bracket and formed with a rib engaging the said slot, together with lamp screws holding said arms together.

5. In the combination defined in claim 1, said bracket having an arm extending away from said shaft and formed with a slot extending in like direction, the bearing for the driven pulley being disposed below said arm but supported in a frame or carrier having an upwardly extending arm lapped against the arm of the bracket and formed with a rib engaging the said slot, together with clamp screws holding said arms together, each of said arms having a lug extending parallel to the shaft axis, said lugs having aligned apertures and an adjusting screw having threaded engagement with the aperture of one lug, while its head bears upon the other lug for tensioning a belt connecting the first and second pulleys.

In testimony whereof, I have hereunto set my hand at Chicago, Illinois, this 30 day of January, 1920.

HENRY KOCOUREK.